UNITED STATES PATENT OFFICE.

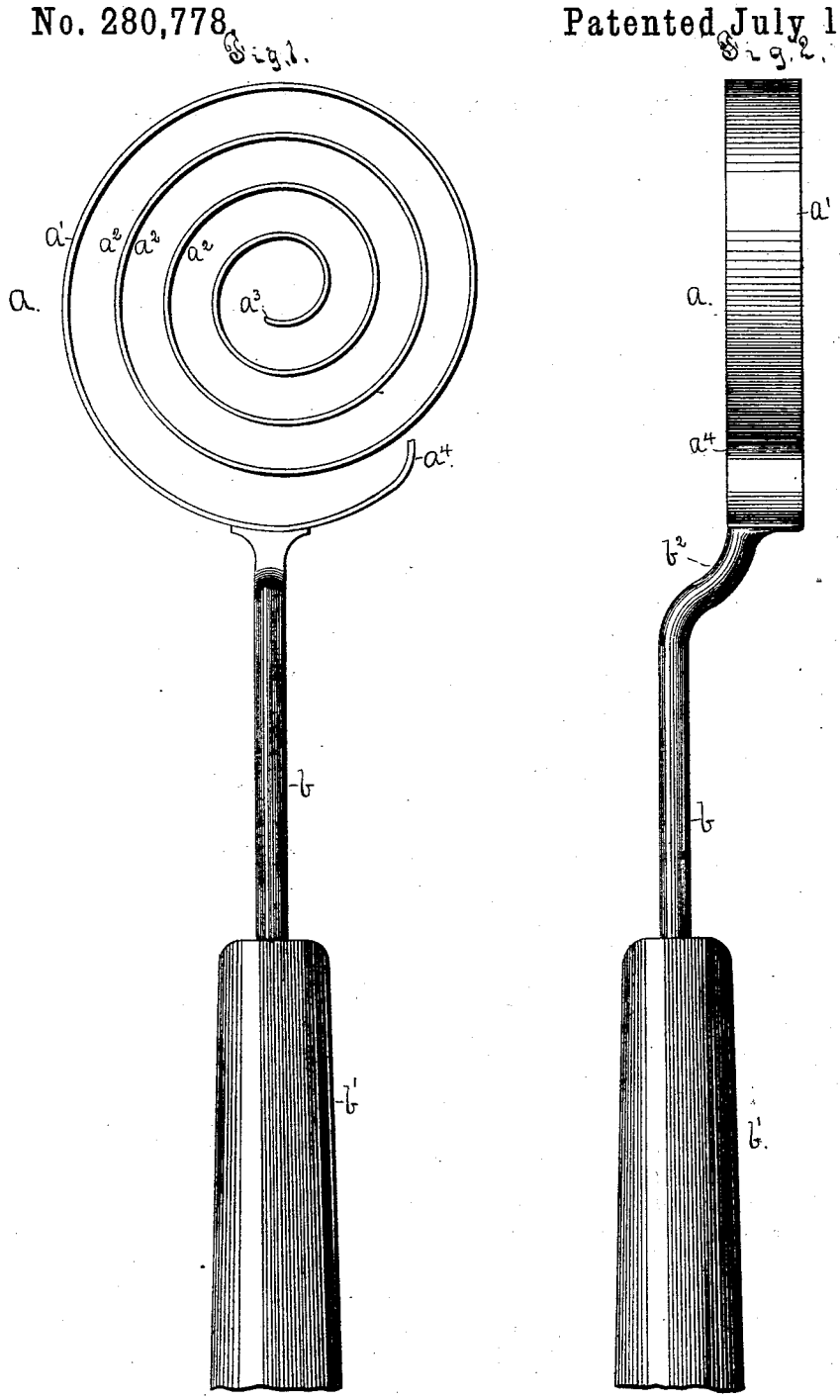

JOHN M. ANDREAE, OF BROCKTON, MASSACHUSETTS.

DEVICE FOR FRYING CAKES.

SPECIFICATION forming part of Letters Patent No. 280,778, dated July 10, 1883.

Application filed February 15, 1883. (No model.)

*To all whom it may concern:*

Be it known that I, JOHN M. ANDREAE, a citizen of the United States, residing at Brockton, in the county of Plymouth and State of Massachusetts, have invented certain new and useful Improvements in Devices for Frying Cakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in devices for cooking cakes; and it consists in the construction and arrangement of the several parts, as will be hereinafter fully described, and particularly pointed out in the claims.

In the drawings, Figure 1 is a plan view, and Fig. 2 is a side elevation, of a device constructed according to my invention.

$a$ is the cake-holder, formed of a narrow strip of suitable metal, $a'$, set on edge, and wound (or otherwise formed) in helical-spring style, with a considerable space, $a^2$, between its several coils.

$a^3$ is the inner and $a^4$ is the outer end of the metallic strip. The outer end, $a^4$, is bent in near to the next inner coil, so that the outer end of the space $a^2$ is contracted. The end $a^4$ might be bent in and joined to the next inner coil, or nearer to it than shown, where it is so desired, the object of contracting the outer opening of space $a^2$ being to prevent the latter from dropping out, as will be understood on reference to the drawings.

$b$ is the shank, having its outer end provided with the handle $b'$, and its inner end, $b^2$, bent downward and made fast to the outer coil of cake-holder $a$, at or near its end $a^4$, as shown, securing the said holder in a plane below the shank $b$, whereby the holder may be dipped in the butter or lard, and be there held in the operation of the device, as will be hereinafter described.

While I prefer to use the shank $b$, having its inner bent end, $b^2$, for the reasons before stated, still it will be understood that when so desired a handle might be otherwise arranged. For instance, a loop or bail could be arranged with its opposite ends secured to the outer coil of the holder $a$; or other devices could be employed, the enumeration of which seem unnecessary.

In the operation of my device, after the batter has been properly prepared, the cake-holder $a$ is placed flat down therein about two-thirds or so of the height of the plate $a'$, and when removed the batter will fill the space $a^2$ between the adjacent coils. It is then placed in a pot or kettle of hot lard or butter, when in a few moments it is thoroughly and deliciously cooked, and will be light and free from over accumulations of grease. When removed from the lard or butter, a light tap on top of the holder $a$ will suffice to cause the cake to drop out of the holder, when the before-described operation may be repeated. Cakes may thus be fried in a few moments, and are highly palatable and digestible.

The form of the holder $a$, as before described, preserves throughout the union of the several parts of the cake, and yet permits its easy removal, greatly facilitating the operation of cooking.

It will be understood that I do not desire to limit myself to the use of sheet metal bent into form, as the holder could be cast of metal in the shape shown, though when thus made it would not be so light, yet it might be more serviceable. I prefer, however, to make the holder of sheet metal, as when so constructed it possesses elasticity or "spring," and when the handle is secured at or near the end $a^4$ of the outer coil this elasticity aids in removing the cakes, as, instead of tapping on the top of the holder, as before described, the operator, when the cake is cooked, may throw the holder forward toward the receptacle and stop it with a jerk, and the several coils of the elastic holder will expand, and the cake will fall into the plate or other receptacle placed to receive it.

By securing the shank at or near the end $a^4$ of the outer coil and making the latter of spring sheet metal great elasticity is had in the holder, and the cake may be readily removed therefrom by the operation last described.

Having thus described my invention, what I claim, and desire to secure by Letters Patent, is—

1. In a device for cooking cakes, the holder $a$, formed of a thin metallic plate or strip set on edge and bent or cast into a helical form, and provided with a suitable handle, as set forth.

2. A cake-cooking device consisting of a metallic, elastic, or flexible plate set on its edge and coiled in helical form, and a handle, $b^2$, having a downwardly-bent shank, the end of the bent shank of the handle being secured to the outer free end of the helical plate, as set forth.

3. A cake-cooking device consisting of a metallic, elastic, or flexible plate set on its edge and coiled in helical form, and having the point of its outer or free end turned inward to touch or nearly touch the surface of the next inner or adjacent coil, as and for the purposes set forth.

In testimony whereof I affix my signature in presence of two witnesses.

JOHN M. ANDREAE.

Witnesses:
ELIOT L. PACKARD,
CORNELIUS E. HOOPER.

Correction in Letters Patent No. 280,778.

It is hereby certified that in Letters Patent No. 280,778, granted July 10, 1883, upon the application of John M. Andreae, of Brockton, Massachusetts, for an improvement in "Devices for Frying Cakes," an error appears in line 35, page 1, of the printed specification, forming a part of said Patent, requiring correction as follows: The word "latter" should read *batter*; and that the specification should be read with this correction therein to make it conform with the record of the case in the Patent Office.

Signed, countersigned, and sealed this 17th day of July, A. D. 1883.

[SEAL.]

H. M. TELLER,
*Secretary of the Interior.*

Countersigned:

E. M. MARBLE,
*Commissioner of Patents.*